United States Patent [19]
Dulnig et al.

[11] Patent Number: 5,595,414
[45] Date of Patent: Jan. 21, 1997

[54] TRAILER THAT TRANSFORMS INTO PLATFORM

[76] Inventors: Nikolai A. Dulnig; Gernot M. Massner, both of Augasse 4, A-6060 Hall, Austria

[21] Appl. No.: 384,983

[22] Filed: Feb. 7, 1995

[30] Foreign Application Priority Data

Oct. 13, 1994 [CH] Switzerland ............... 3069/94

[51] Int. Cl.$^6$ .................................................. B60P 3/025
[52] U.S. Cl. ........................ 296/26; 296/21; 296/27; D12/83; D12/102
[58] Field of Search .................. 296/1.1, 21, 26, 296/27; 52/64, 69, 70, 71; D12/83, 101, 102, 105

[56] References Cited

U.S. PATENT DOCUMENTS

| D. 309,124 | 7/1990 | Young | D12/102 |
| D. 320,771 | 10/1991 | Crawford | D12/83 |
| 410,477 | 9/1889 | Young et al. | 296/21 |
| 618,634 | 1/1899 | Young et al. | 296/21 |
| 3,766,693 | 10/1973 | Richards, Jr. et al. | 52/71 |
| 4,535,933 | 8/1985 | Kuiper | 296/26 X |
| 4,640,061 | 2/1987 | Trumley | 52/71 |
| 4,958,874 | 9/1990 | Hegedus | 296/26 |
| 5,078,422 | 1/1992 | Rau et al. | 296/26 |
| 5,106,142 | 4/1992 | Hegedus | 296/26 |

*Primary Examiner*—Andrew C. Pike
*Attorney, Agent, or Firm*—Joseph C. Mason, Jr.; Mason & Associates P.A.

[57] ABSTRACT

A portable platform has a first configuration where it may be transported safely over public highways and a second configuration where it is transformed into a display that attracts crowds of visitors at a fair or festival. The platform is elevated above a support surface by a conventional wheel and axle assembly, and is accessible when in its display mode by a stairway. A large structure positioned at one end of the platform is shaped like a beverage bottle, to be promoted and has a hollow interior to house equipment and workers. A door formed in the structure admits personnel, and a window enables the serving of the product being promoted to patrons attracted to the platform by the large structure. Safety rails and a tent-like covering complete the assembly.

10 Claims, 5 Drawing Sheets

TRAILER THAT TRANSFORMS INTO PLATFORM

BACKGROUND OF THE INVENTION

1. Field of the Invention

This invention relates, generally, to structures having utility for advertising products. More particularly, it relates to an apparatus having a first configuration that attracts customers to a sales location and a second configuration that enables transportation of the apparatus.

2. Description of the Prior Art

U.S. Pat. Nos. 4,958,874 and 5,106,142, both to Hegedus, disclose a mobile exhibition unit having a folded, transport configuration and an unfolded, display configuration. No means other than conventional signage, however, are provided for attracting members of the public thereto. U.S. Pat. No. 4,535,933 to Kuiper discloses a truck having sidewalls and a roof that fold down to provide a platform when the vehicle is not in motion. Rau et al., in U.S. Pat. No. 5,078,442, disclose a similar structure.

The known structures are roadworthy only because they have a low profile. The art provides no-teachings or suggestions as to how an apparatus having a tall attention-attracting structure, such as a giant wine bottle, could be provided.

In view of the art at the time the present invention was made, it was not obvious to those of ordinary skill in this art how such an apparatus could be provided.

SUMMARY OF THE INVENTION

The longstanding but heretofore unfulfilled need for an apparatus that overcomes the limitations of the prior art is now met by a new, useful, and nonobvious invention. The present invention is a mobile apparatus including a tall, hollow structure that includes a base part and a top part that are detachably interconnected so that the top part may be removed from the base part when the apparatus is configured for transportation.

More particularly, the novel apparatus includes a platform having a leading end, a trailing end, and a pair of sides. A wheel and axle assembly support the platform and enable transportation of the platform over highways. A side wall is hingedly mounted to each side of the platform, each side wall having a first upstanding position and a second position where it is deployed in substantially a horizontal plane. An end wall is hingedly mounted to the trailing end of the platform and it also has a first upstanding position and a second position where it is deployed in a substantially horizontal plane.

A hollow structure is secured to and supported by the platform; the structure has an interior of predetermined size to permit entry thereinto of at least one person. A door is formed in the hollow structure to provide ingress and egress. At least one stairway permits entry onto the platform from a ground surface. A window is formed in the hollow structure so that a person positioned in said hollow structure may dispense items to persons standing on the platform.

Safety rails are provided about the perimeter of the platform, and the platform may be covered by a tent means when desired.

It is a primary object of this invention to advance the art of mobile exhibition units.

A more specific object is to provide a structure having a tall attention-grabbing display, but which includes means for reducing the effective height of the display when it is transported over public roads.

These and other important objects, features, and advantages of the invention will become apparent as this description proceeds.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
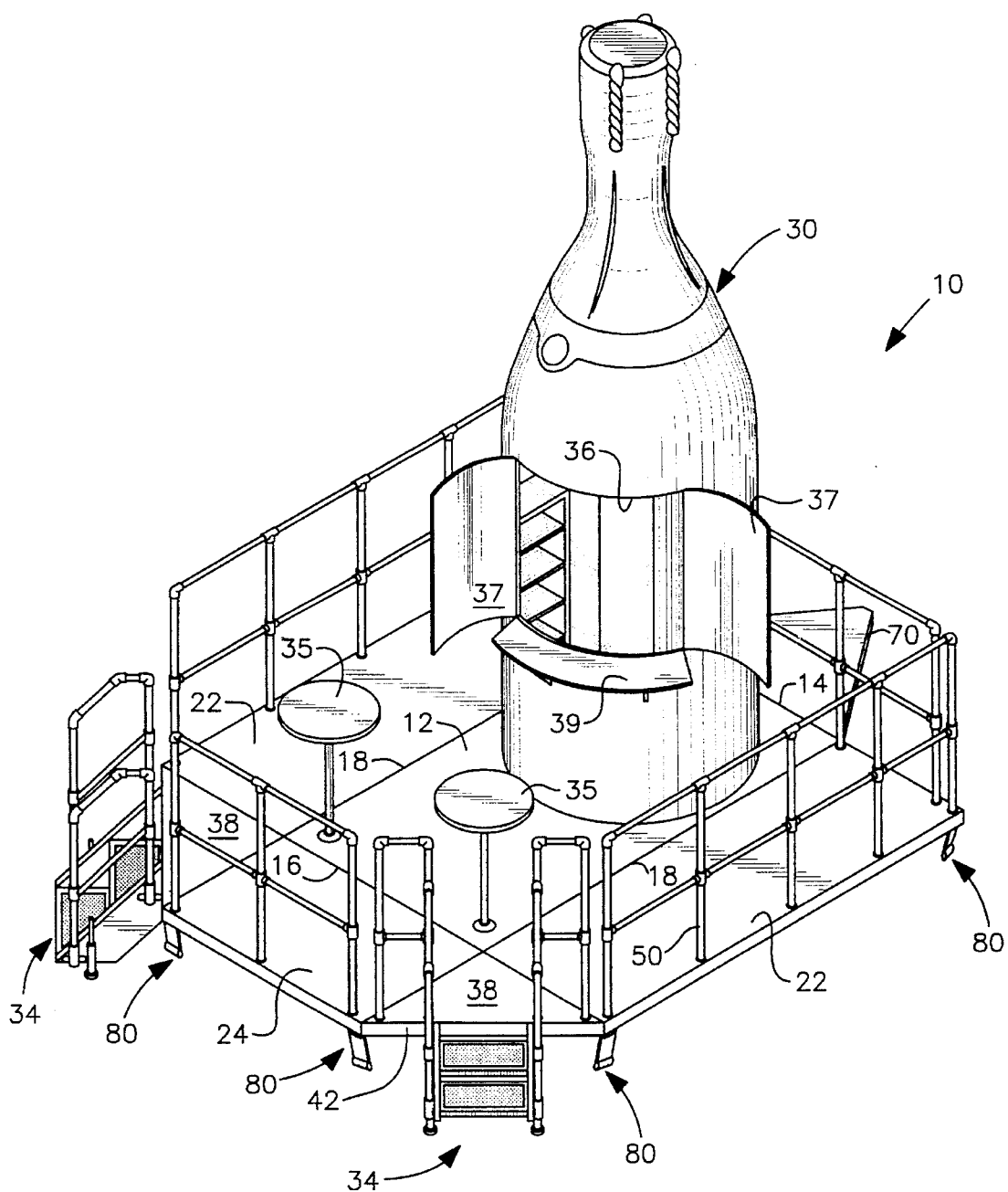
FIG. 1 is a perspective view of an exemplary embodiment of the invention.

Referring now to FIG. 1, it will there be seen that an illustrative embodiment of the invention is denoted as a whole by the reference numeral 10.

Trailer 10 preferably includes a square or rectangular platform 12 having a leading end 14, a trailing end 16, and a pair of sides collectively denoted 18.

Figure 5:
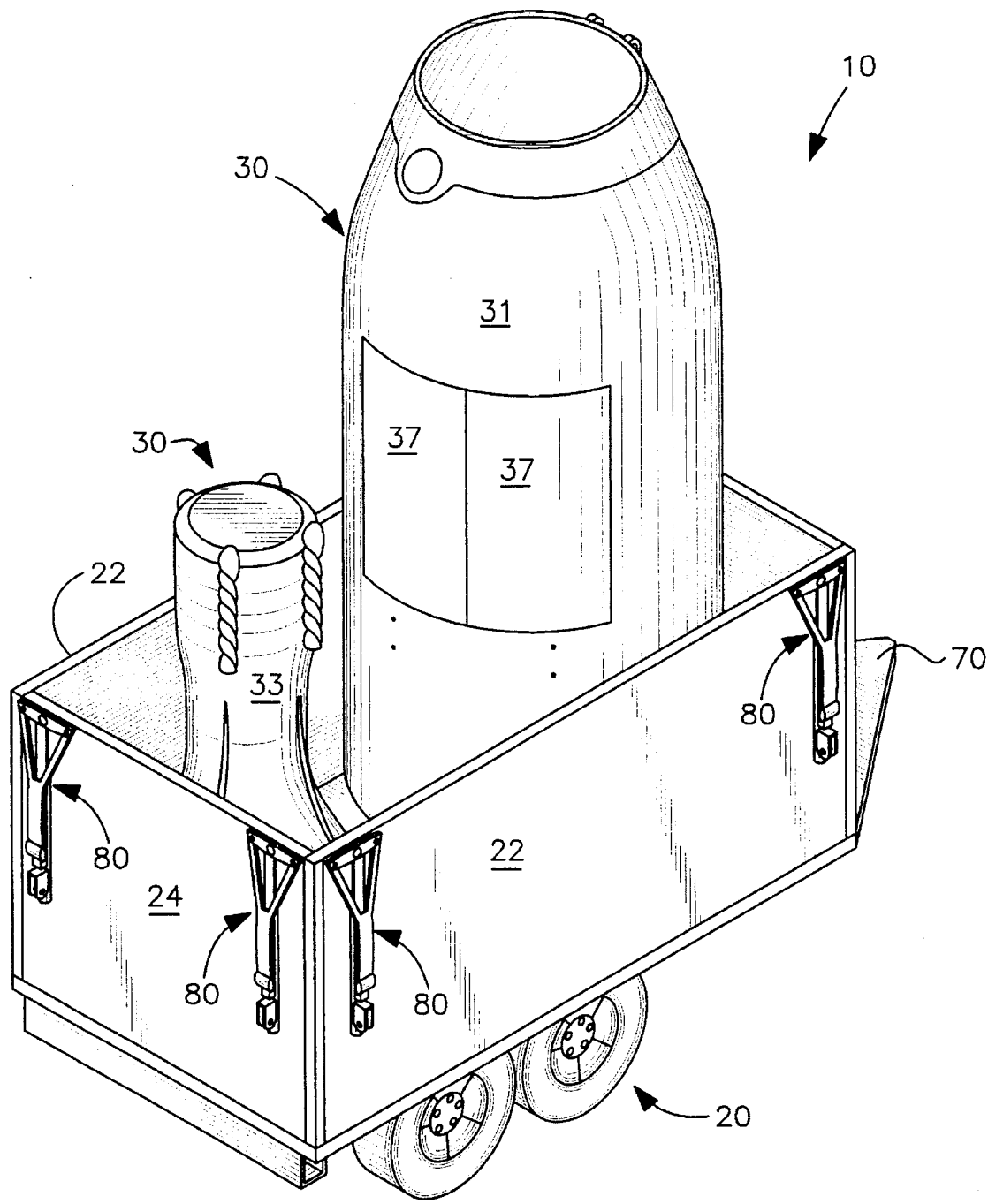
FIG. 5 is a perspective view of the novel structure when in its road-worthy configuration.

As best understood in connection with FIG. 5, a wheel and axle assembly, generally denoted 20, supports platform 12 and enables transportation thereof over public roads; a double axle is preferred to stabilize the platform when in transport.

Figure 2:
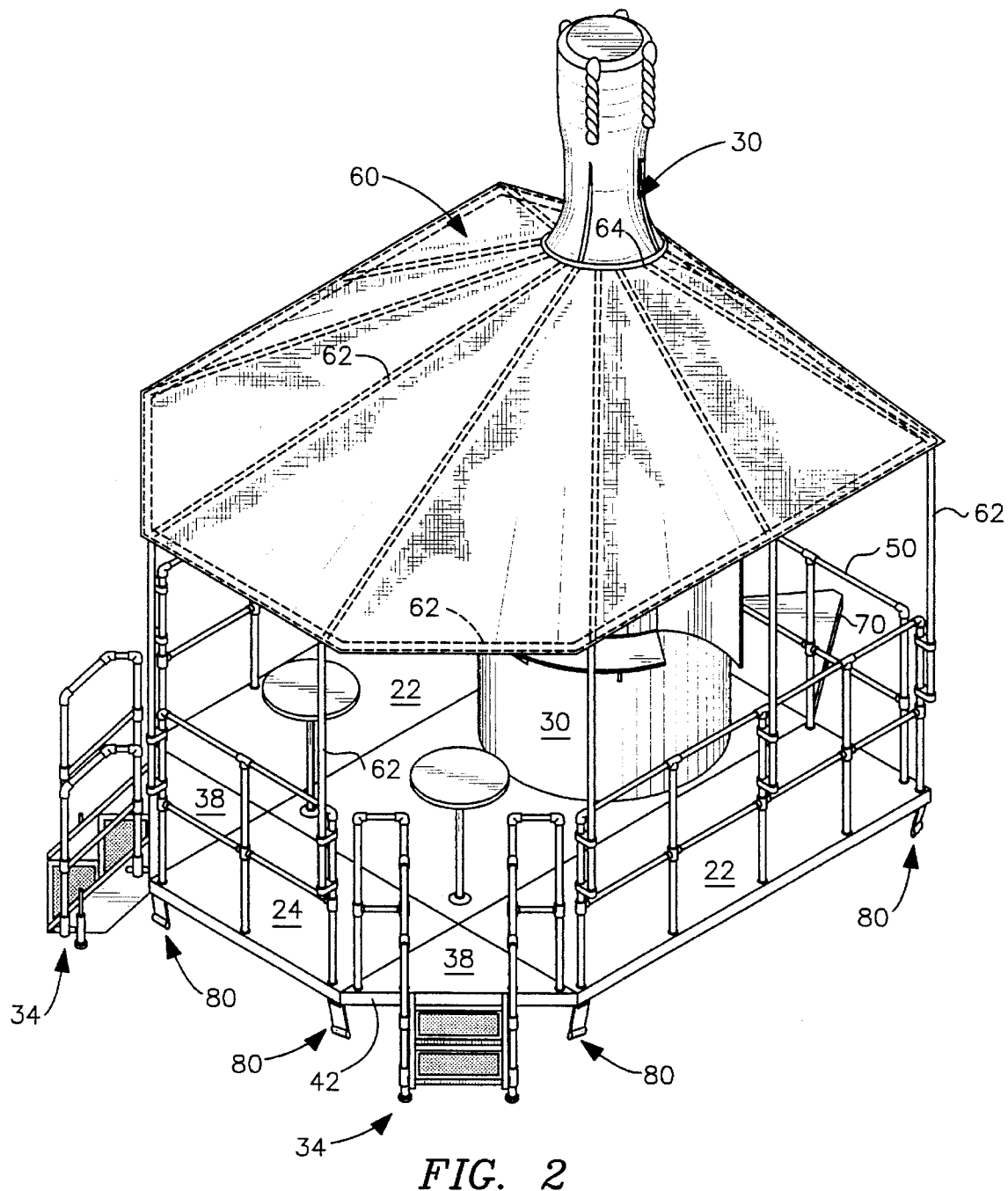
FIG. 2 is a perspective view of the embodiment of FIG. 1 when a canopy or tent means has been added thereto.
Figure 3:
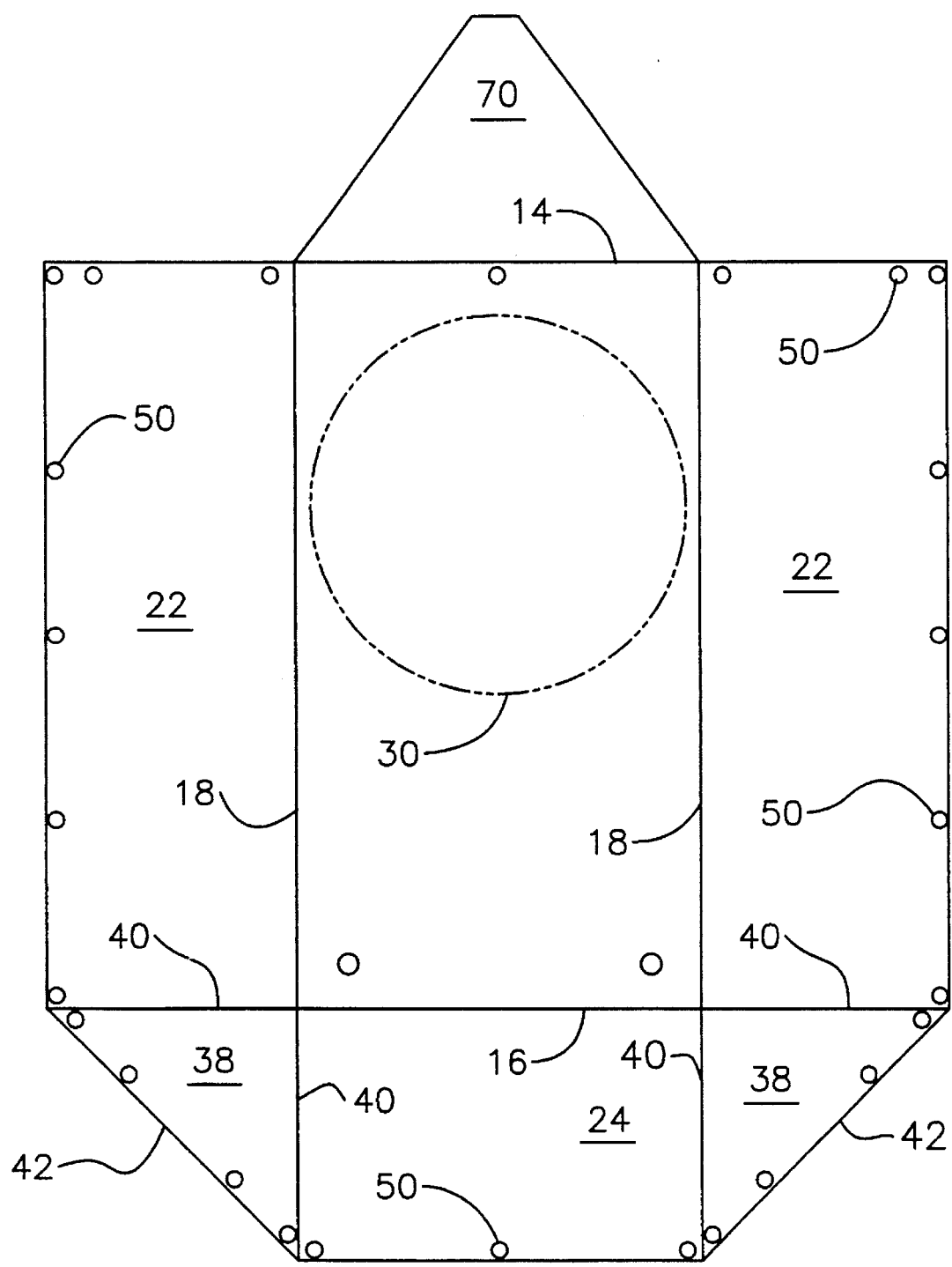
FIG. 3 is a top plan view of the novel platform when in its unfolded or deployed configuration.

As depicted in FIGS. 1–3 and 5, a side wall 22 is hingedly mounted to each side 18 of platform 12; each side wall 22 has a first upstanding position (FIG. 5) and a second deployed position in a substantially horizontal plane (FIGS. 1–3). Each side wall 22 is in its upstanding configuration when the novel structure 10 is in its transport mode, as depicted in FIG. 5, and each side wall 22 is horizontally deployed when structure 10 is not in its transport mode, as depicted in FIGS. 1–3.

End wall 24 is hingedly mounted to trailing edge 16 of platform 12; like side walls 22, 22, it is deployed in an upstanding position when assembly 10 is in transport and it is deployed in a horizontal position when assembly 10 is in use at a site.

Figure 4:
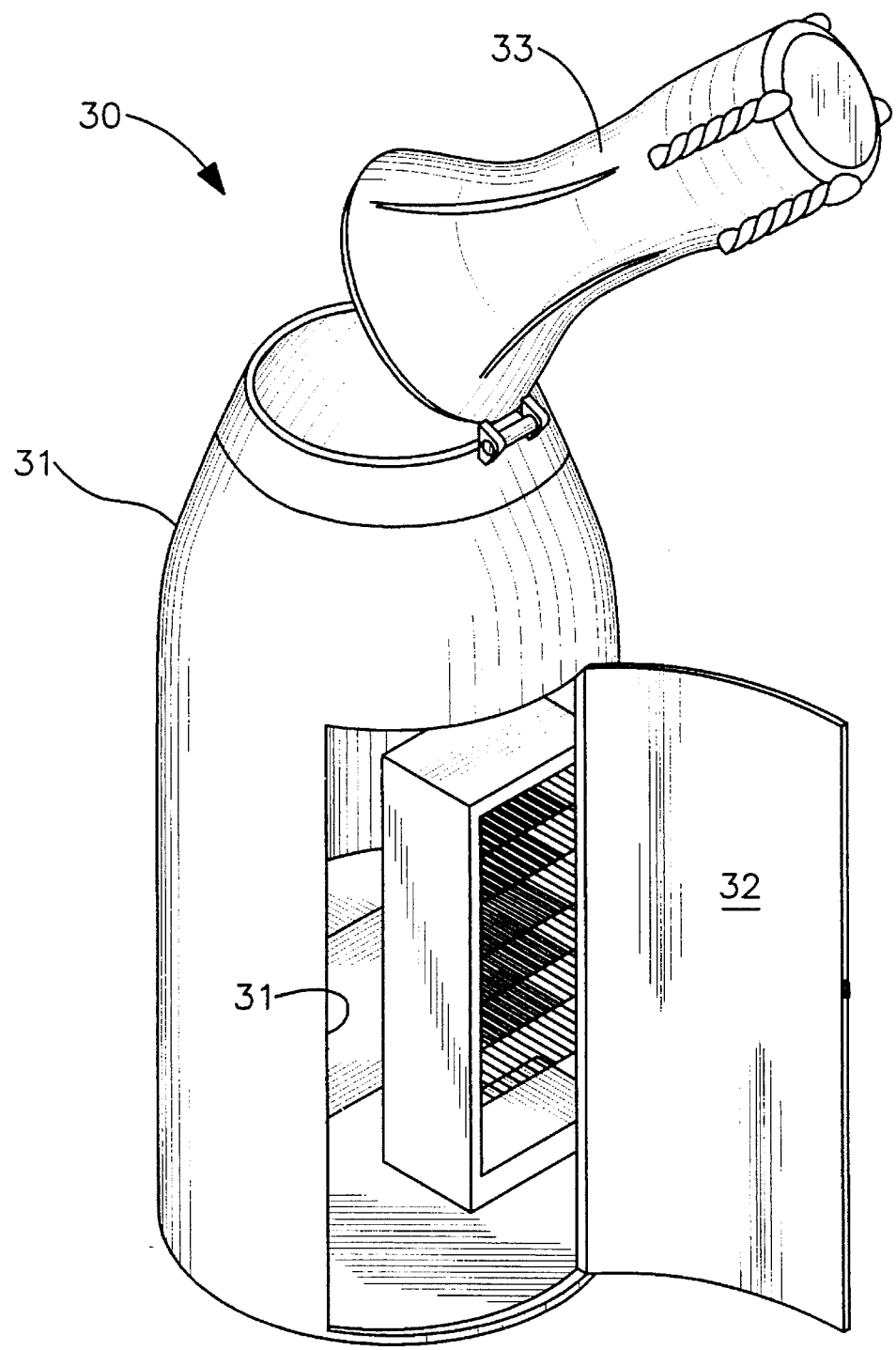
FIG. 4 is a perspective view of a simulated bottle employed in the embodiment of FIG. 1.

A hollow structure 30 which may take any form is secured to and supported by platform 12. As should be clear from FIG. 4, the hollow structure has an interior of predetermined size to permit entry thereinto of at least one person.

A door opening 31 closeable by curved, hingedly mounted door 32 (FIG. 4) is formed in structure 30 to provide ingress and egress into and from its hollow interior, respectively.

Assembly 10 further includes at least one stairway 34 (FIGS. 1 and 2) providing access onto and from platform 12 from a ground surface. In a preferred embodiment, a pair of stairways is provided.

Window 36, closeable by hinged shutters 37, is formed in structure 30 so that a person within its hollow interior may hand preselected articles to persons standing on platform 12; shelf 39 facilitates such service in the well-known way.

Tables 35 are also provided for the convenience of patrons.

Note that shutters 37, 37 are curved like door 32 to match the curvature of hollow structure 30 so that they conform to such structure when closed as depicted in FIG. 5.

Hollow structure 30 is preferably positioned on platform 12 intermediate sides 18 of platform 12 and near leading end 14 thereof, as perhaps best understood in connection with FIG. 3. The structure is oriented so that door 32 (FIG. 4) faces leading edge 14 of the structure, and window 36 faces trailing side 16 thereof.

Hollow structure 30 includes a base 29 and a top part 33 that surmounts said base. The top part is hingedly and detachably secured to base 29 so that said top part may be removed as indicated in FIG. 5.

A pair of right angle triangle-shaped pieces 38 are positioned and secured between opposite sides of end wall 24 and respective trailing ends of side walls 22, 22 when said end wall and side walls are deployed. Each of said pieces 38 has a pair of edges 40, disposed ninety degrees to one another, and a third edge 42 that forms a hypotenuse.

A stairway 34 is advantageously connected to platform 12 at each hypotenuse 42 of triangular pieces 38, 38, as depicted in FIGS. 1 and 2.

Safety railings 50 are mounted about a periphery of platform 12.

As depicted in FIG. 2, assembly 10 may further include a canopy or tent means 60 having an aperture formed therein that receives the top part of structure 30. A plurality of tent support poles 62, mounted to safety railings 50 at their respective outer ends, form a ring or grommet 64 about said aperture as depicted.

A trailer hitch means 70 is permanently attached to the leading end 14 of platform 12, said trailer hitch being positioned below a horizontal plane occupied by said platform to facilitate its releasable attachment to a conventional tow bar, not shown.

As best understood from FIGS. 1, 2, and 5, a support assembly, generally denoted 80, supports side walls 22, 22 and end wall 24 when said side walls and said end wall are horizontally deployed. Note from FIG. 5 that there are two of said support assemblies 80 for each of said walls, and that said assemblies are flat against said walls when the platform is in its transport mode.

Hollow structure 30 may take many different forms, all of which are within the scope of this invention. Where novel assembly 10 is to be employed to promote a wine, structure 30 would take the form of a large wine bottle. It has been found that a structure that is twenty times larger than a conventional-size wine bottle is attractive and may accommodate two people and various items of equipment therein, such as a refrigerator, sink, shelving, and the like, that makes the structure suitable for use as a bar that serves patrons attracted to structure 10 by its unique appearance.

The simple yet elegant construction of structure 10 enables it to be erected or disassembled and prepared for transportation in the absence of special tools.

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

We claim:

1. A mobile apparatus, the apparatus comprising:

a platform having a leading end, a trailing end, and a pair of sides;

a wheel and axle assembly for supporting said platform and enabling transportation of said platform over public roads;

a side wall hingedly mounted to each side of said platform, each side wall having a first upstanding position and a second deployed position in a substantially horizontal plane;

an end wall hingedly mounted to said trailing end of said platform, said end wall having a first upstanding position and a second deployed position in a substantially horizontal plane;

a hollow structure secured to and supported by said platform, said hollow structure having an interior of predetermined size to permit entry thereinto of at least one person;

a door formed in said structure to provide ingress and egress into and from said hollow structure, respectively; and at least one stairway permitting entry onto said platform from a ground surface;

said hollow structure including a base part and a top part that surmounts said base part, said top part being detachably secured to said base part.

2. The apparatus of claim 1 further comprising:

a window formed in said structure so that a person within said hollow structure may hand preselected articles to persons standing on said platform.

3. The apparatus of claim 2, wherein said hollow structure is positioned on said platform intermediate said sides of said platform, wherein said door is positioned on a leading side of said structure, and wherein said window is positioned on a trailing side of said structure.

4. The apparatus of claim 1, further comprising a pair of right angle triangle-shaped pieces that are positioned and secured between opposite sides of said end wall and respective trailing ends of said side walls when said end wall and said side walls are deployed, each of said right angle triangle-shaped pieces having a hypotenuse that forms a peripheral edge of said platform.

5. The apparatus of claim 4, wherein said at least one stairway meets said platform at said hypotenuse thereof.

6. The apparatus of claim 1, further comprising safety railings mounted about a periphery of said platform.

7. The apparatus of claim 6, wherein said wheel and axle assembly includes a pair of axles.

8. The apparatus of claim 6, further comprising a tent means having a central part thereof attached to said hollow structure, and a plurality of tent support poles mounted to said safety railings, said tent means being secured to said support poles.

9. The apparatus of claim 1, further comprising a trailer hitch means permanently attached to said leading end of said platform, said trailer hitch means being positioned below a horizontal plane occupied by said platform.

10. The apparatus of claim 1, further comprising a support means mounted to each of said side walls and to said end wall for supporting said side walls and said end wall when said side walls are deployed in said substantially horizontal plane and when said end wall is deployed in said substantially horizontal plane.

* * * * *